Patented June 12, 1951

2,556,278

UNITED STATES PATENT OFFICE 2,556,278

COATED FOOD

Arthur E. Irvine, Tenafly, N. J., assignor, by mesne assignments, to Union Carbide and Carbon Corporation, a corporation of New York No Drawing. Application April 10, 1948,
Serial No. 20,360

1 Claim. (Cl. 99—169)

This invention relates to the coating of edible products, and it more particularly relates to the coating of processed or semi-processed foods, such as meats, cheese and frozen foods.

The coating of this invention comprises a microcrystalline hydrocarbon wax containing small amounts of solid polyethylene resins. The polyethylene resins readily dissolve in the molten wax and the coating is easily applied by dipping the food product in the molten mixture. Upon removing the food product and cooling, the molten wax and polyethylene solidify to form a hard, protective coating on the foodstuff. This coating differs from the ordinary wax coating which is found on some brands of cheese, in that it will withstand rough handling without cracking, but, on slitting with a knife, the coating may be readily peeled from the food product. The coating has sufficient strength so that, in many instances, after slitting, it may be removed intact from the foodstuff.

The composite coating of wax and polyethylene protects the foodstuff from dehydration and from decay caused by dampness or mold. Under ordinary conditions, processed meat during export shipment loses 10% of its weight through dehydration with resulting damage to the flavor and texture of the meat. Tests indicate that processed meat packaged with the coating of this invention loses less than 1% of its weight during storage for several months at room temperature.

Unlike coatings of wax alone, the composite coating of wax and polyethylene does not lose its strength at the reduced or elevated temperatures encountered in shipment of a foodstuff. Furthermore the composite coating does not adhere to itself at these elevated temperatures, as do coatings of wax alone, so that a plurality of coated foodstuffs may be shipped in one container, and each package removed intact at the point of destination.

The amount of polyethylene included in the wax may vary from 1 to 10% of the total composition. Preferably, the polyethylene constitutes from 5 to 10% of the composition when it has an average molecular weight in the range of 2000 to 10,000, and from 1 to 4% when it has an average molecular weight in the range of 10,000 to 30,000. The temperature of the molten wax used in the dipping process may vary from 160° to 210° F., depending on the content of polyethylene resin in the wax; more heat being required to dissolve the larger amounts of polyethylene. The thickness of the coating applied per dip depends on the fluidity of the molten mixture which increases with temperature. Although one coat is sufficient, better results are obtained if the foodstuff is dipped twice in the molten mixture. In either case, the final product is hermetically sealed. If desired, a loosely woven cloth may be applied as an intermediate wrapper between the first coat and a subsequent coat. Also, staple fibers may be dispersed in the molten mixture to increase the tenacity of the final coating.

The wax employed should be a microcrystalline hydrocarbon wax; ordinary low-melting paraffin wax is not suitable. The microcrystalline waxes employed may have a melting point range of 130° to 195° F., but I prefer a wax having a melting point of 150° to 170° F. The microcrystalline waxes are preferred for this application because they are more flexible than paraffin wax. The microcrystalline waxes retain their flexibility when modified with polyethylene, and their resistance to blocking is greatly enhanced.

What is claimed is:

A coated edible product comprising a processed meat product of a type normally subject to dehydration totally enclosed and hermetically sealed in a continuous coating comprising a microcrystalline hydrocarbon wax having a melting point of 150° to 170° F. and containing from 1 to 4% by weight of the total composition of polyethylene having an average molecular weight between 10,000 and 30,000.

ARTHUR E. IRVINE.

REFERENCES CITED

The following references are of record in the file of this patent:

UNITED STATES PATENTS

| Number | Name | Date |
|---|---|---|
| 2,352,611 | Bowers | July 4, 1944 |
| 2,469,914 | Bridgeman | May 10, 1949 |

OTHER REFERENCES

"British Plastics," 1945, article entitled "The Properties and Uses of Polythene," part III, by E. L. Midwinter, pages 208 to 215.